United States Patent [19]

Rakes et al.

[11] Patent Number: 4,459,462

[45] Date of Patent: Jul. 10, 1984

[54] DRIVE SYSTEM FOR ENERGIZING ELEMENTS OF A FIXED BAR PRINTER

[75] Inventors: James M. Rakes, Leander; Errol R. Williams, Round Rock, both of Tex.

[73] Assignee: International Business Machines Corporation, Armonk, N.Y.

[21] Appl. No.: 452,988

[22] Filed: Dec. 27, 1982

[51] Int. Cl.[3] ............................ H05B 1/02; B41J 3/20; G01D 15/10

[52] U.S. Cl. ................................ 219/216; 346/76 PH

[58] Field of Search ............ 219/216 PH; 346/76 PH, 346/76 R; 400/120; 101/93.04; 364/519, 523

[56] References Cited

U.S. PATENT DOCUMENTS

| | | | |
|---|---|---|---|
| 4,091,391 | 5/1978 | Kozima | 219/216 PH |
| 4,099,046 | 7/1978 | Boynton et al. | 219/216 |
| 4,128,345 | 12/1978 | Brady | 346/76 R |
| 4,287,521 | 9/1981 | Hakoyama | 219/216 PH |
| 4,377,972 | 3/1983 | O'Neil | 346/76 PH |
| 4,394,092 | 7/1983 | Osmera | 346/76 PH |

*Primary Examiner*—Roy N. Envall, Jr.
*Assistant Examiner*—Teresa J. Walberg
*Attorney, Agent, or Firm*—Andrea P. Bryant

[57] ABSTRACT

A drive system for energizing the elements of a fixed bar printer of the type in which a pair of parallel bars, of, for example, resistive material, have a series of first connections to individual bars interspersed by second connections to both bars. By driving a second connection, any one of four elements can be energized by selecting one of the adjacent first connections as a voltage source path. The drive lines which return current are fed by a driver/shift register system having a stage for each drive line. Data is fed to the driver/shift register system serially from a plurality of memories, each of which has a capacity equal to that of the driver/shift register system. The memories are grouped in fours, so that each memory stores data for energizing one of the print bar elements in each group of four defined by a drive connection and its adjacent current return connections. An addressing system controls the sequence of loading and unloading the memories. This sequence differs in accordance with whether non coded, i.e. line, data or coded, i.e. binary coded character, data is received.

8 Claims, 3 Drawing Figures

DRIVE SYSTEM FOR ENERGIZING ELEMENTS OF A FIXED BAR PRINTER

DESCRIPTION

Related Application

U.S. patent application Ser. No. 452,994, filed Dec. 27, 1982 in the names of W. Goff Jr., J. M. Rakes and E. R. Williams and assigned to the assignees of the present application, relates to a printer head with which the subject drive circuit may be used.

TECHNICAL FIELD

The present invention relates to a drive circuit system for printers employing fixed printing elements.

BACKGROUND ART

Many printers employing fixed printing elements have been shown in the prior art. Most of these employ discrete printer elements which are energized to produce heat to generate dots on heat sensitive paper or to effect transfer of heat-transfer ink on to plain paper. U.S. Pat. No. 4,099,046 (Boyton et al) shows a system in which a single bar of resistive material extends across a sheet to be printed. The bar is divided into printing elements by connections along its sides in a zig-zag formation. When a current is applied through adjacent connection on opposite sides, the portion of the bar therebetween is heated to produce a dot on the paper. In the related application cited above, a printer employing a heated bar system is described. That system differs from the prior bar system in that two print bars are employed. Drive lead connections are made to each bar separately and further connections are made to both bars. For each connection to both bars, currents can be established through the bars to any of four of the separate connections adjacent thereto.

DISCLOSURE OF THE INVENTION

The present invention provides a drive system which is particularly useful for the above mentioned two bar print head. It is, however, not limited in use to a thermal printer, but may be employed to drive, for example, a printer employing bars of light emitting material, similarly connected.

According to the invention, there is provided a drive system for driving the elements of a non-impact printer using a two row array of elements having voltage source lines coupled to individual rows interspersed with drive return lines coupled to both rows to define groups of four elements between each drive line and its adjacent voltage supply lines, said system comprising drive means having a plurality of stages corresponding in number to the voltage source lines and each coupled to a corresponding one of the drive return lines, a plurality of memories each having a data capacity equal to that of the drive means, addressing means for controlling the entry of input data into the memories and loading of the drive means from the memories in turn such that the drive means, in accordance with data applied thereto drives, in succeeding periods, the drive lines to effect energization in turn of the correspondingly positioned ones of the elements in each of said groups of four.

BEST MODE FOR CARRYING OUT THE INVENTION

Figure 1:
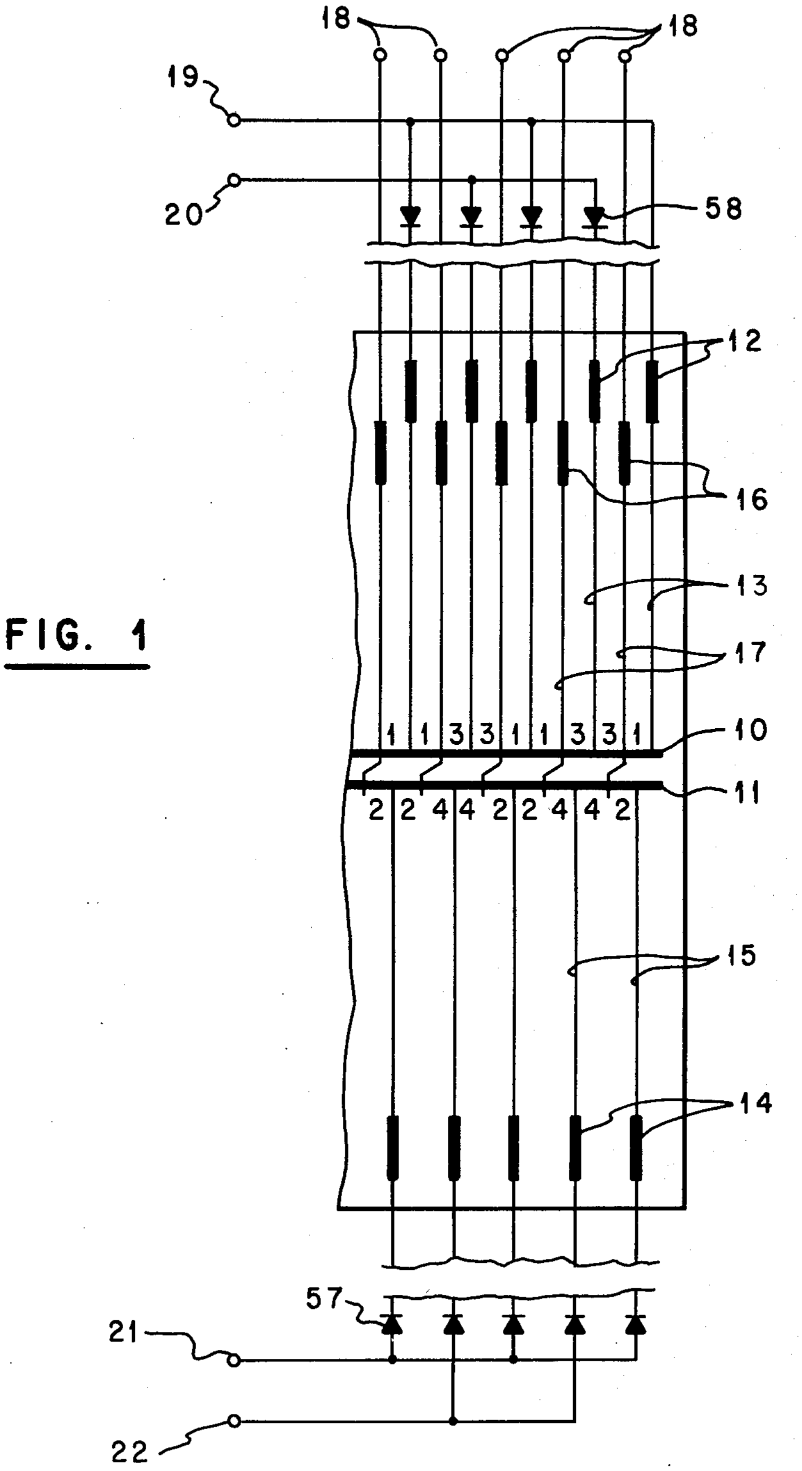
FIG. 1 is a cut-away top view of a portion of a thermal print head with which the present invention may be employed.

FIG. 1 shows a portion of a suitable print head with which the present invention may be employed. It should be noted that this drawing is a highly magnified view of the device, and not to scale. The printing elements of the head comprises two bars of resistive material 10 and 11. Connector pads 12 are connected to bar 10 by lines 13 which extend from the pads and underlie and connect to bar 10. Connector pads 14 are connected to bar 11 by lines 15 which underlie and connect to bar 11. Connector pads 16 are connected to lines 17 which underlie, and are connected to, both bars 10 and 11 as shown. Tape cables couple the connector pads to external energizing circuits to the described later. Essentially, the device operates by energizing elements of the bar between connector lines to cause localized heating thereof. When the bars are in contact with a heat sensitive sheet, or a sheet carrying heat transferrable ink, corresponding marks are produced on the sensitive sheet or a sheet in contact with the transfer sheet. For each drive (current return) pulse applied to a terminal 18, any one of four elements 1 through 4 can be so energized by providing a voltage source on any one of terminals 19 through 22. Diodes 57 and 58 provide isolation between voltage source terminals 19 through 22. The bars are of a length sufficient to extend across a sheet entirely, and as a sheet is moved downwardly in FIG. 1, firstly the terminal 19 path is pulsed and selected terminals 18 returned, then terminal 20 and selected terminals 18, followed by terminal 21 and terminals 18 and lastly 22 and terminals 18. Thus, elements 1 are first energized, followed in turn by elements 3, 2 and 4. This produces, on the sheet, a line of dots which may, for example, be one horizontal line of dots in character which are built up from 20 such lines. It is clear that the dots formed by elements 1 will not be exactly aligned with those formed by elements 3, but by suitably arranged the velocity of sheet movement and the timing of the drive and current return arrangements, this misalignment can be made insignificant. The same applies to elements 2 and 4. In addition, by suitably timing the energization of elements 2 and 4 with respect to that of elements 1 and 3 and the sheet velocity, the portions of the line produced by these lower elements can be made to coincide with those produced by the upper elements. In a practical device, the spacing of the center lines of the print bars may be 0.3175 mm and the distance between the bars 0.19 mm. The spacing between adjacent lines 15, and lines 17 may be 0.508 mm, thereby providing a spacing of 0.254 mm between adjacent lines 13 and 17. With a print bar length of 203 mm, at the above spacings, 400 drive lines 17 and 401 of each of return lines 13 and 15 are required. This provides a total of 1600 print elements along the print bars.

Figure 2:
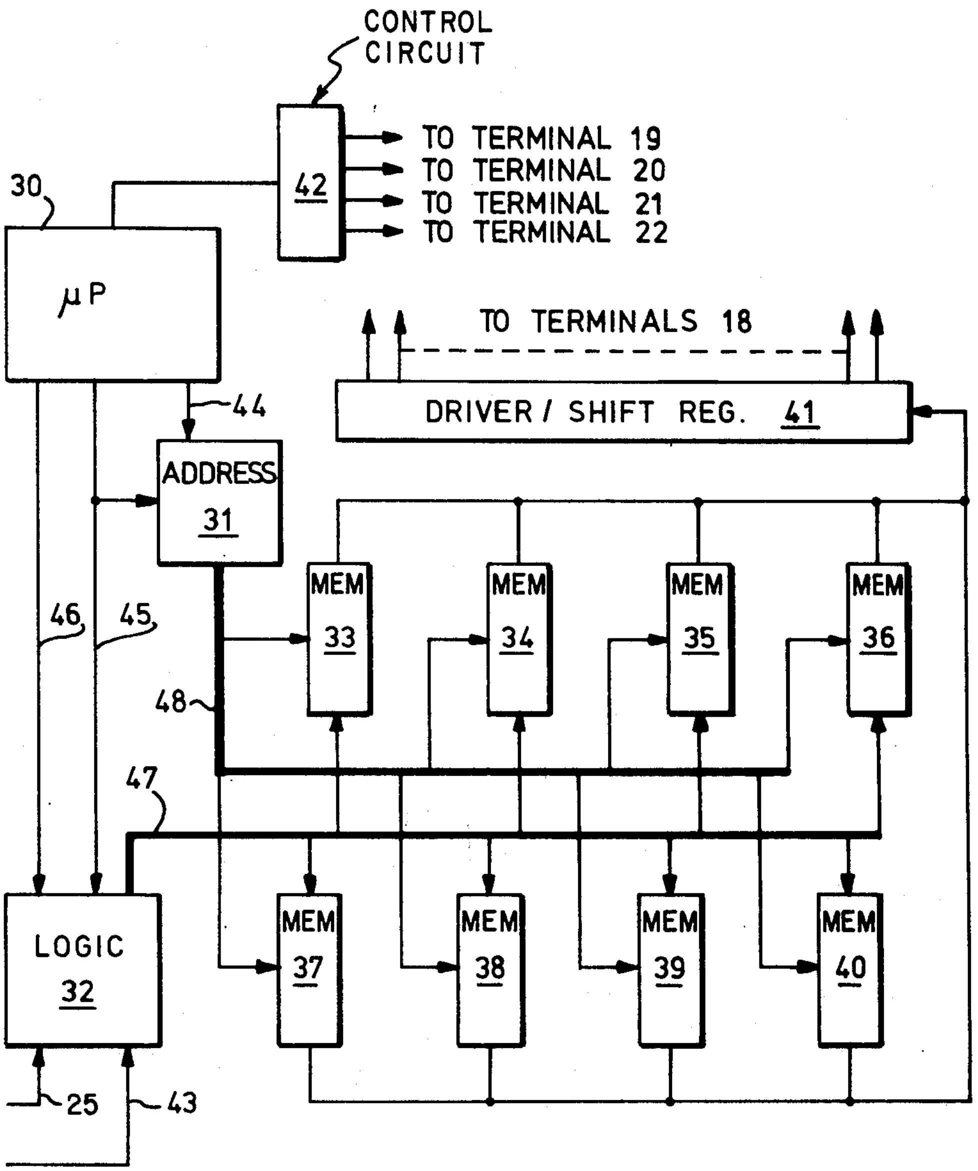
FIG. 2 is a block diagram of a drive system embodying the invention.

FIG. 2 is a simplified block diagram of a drive system for the FIG. 1 print head. This system comprises a control microprocessor 30, address circuits 31, dot logic circuits 32, eight 400 bit memories 33 through 40, a 400 bit driver/shift register 41 and a voltage source control circuit 42. This system can accommodate both non-coded input information, in other words, a dot pattern to be printed, or coded input information, which may comprise character data in binary form. Non-coded information is applied as an input to logic circuits 32 over input line 25 coded information over line 43. It should be noted that this information could be pre-processed by micro-processor 30, in which case these inputs would be received from this micro-processor.

Firstly taking the case when non-coded information, i.e. a stream of dot representing data, is received. For each line of printing, four of the memories 33 through 40 are used. Under control of processor 30 over line 44 and line 45, the latter of which indicates either coded or non-coded information, the address circuits 31 sequence selected groups of memories 33 through 40 for storing the input dot data from logic circuits 32. For the first line, the first data bit is entered into memory 33, the second into memory 37, the third into memory 34 and the fourth into memory 38, the fifth back into memory 34, the sixth into memory 38, the seventh into memory 33, and the eighth into memory 37. Each subsequent group of eight data bits is then entered into these memories in the same sequence. When the reception of 1600 data bits is detected, the micro-processor signals to logic circuit 32 over line 46 that a new line is to be started. Thus, at this time, a sequence of 1600 data bits is stored in memories 33 through 38 in interleaved form. These bits are then applied to driver/shift register 41 in sequence to energize the elements of the print bars of FIG. 1.

Driver/shift register has 400 stages, the outputs of which are each coupled to an associated one of the terminals 18 of FIG. 1. In printing the first line on a sheet, the content of memory 33 is first applied to driver/shift register 41 for storage therein. Then, when the upper line of voltage source control circuit 42, which is coupled to terminal 19 in FIG. 1, is operated, the driver/shift register contents drive lines 18 of FIG. 1 by providing current return capability in accordance with the data previously received from memory 33. Thus, selected print elements of the print bar 10 and indicated with the numeral 1 in FIG. 1, are energized. Thereafter the content of memory 37 is applied to the driver/shift register 41, the second line from control circuit 42 is operated and the driver/shift register 41 drives lines 18 to energize selected elements 3 of print bar 10. Then, the content of memory 34 is applied to the driver/shift register and the third line of control circuit 42 is operated to energized selected elements 4 of print bar 11 from the driver/shift register. Lastly, the content of memory 38 is delivered to the driver/shift register, the bottom line of control circuit 42 is operated and the driver/shift register drives elements 4 of print bar 11.

Figure 3:
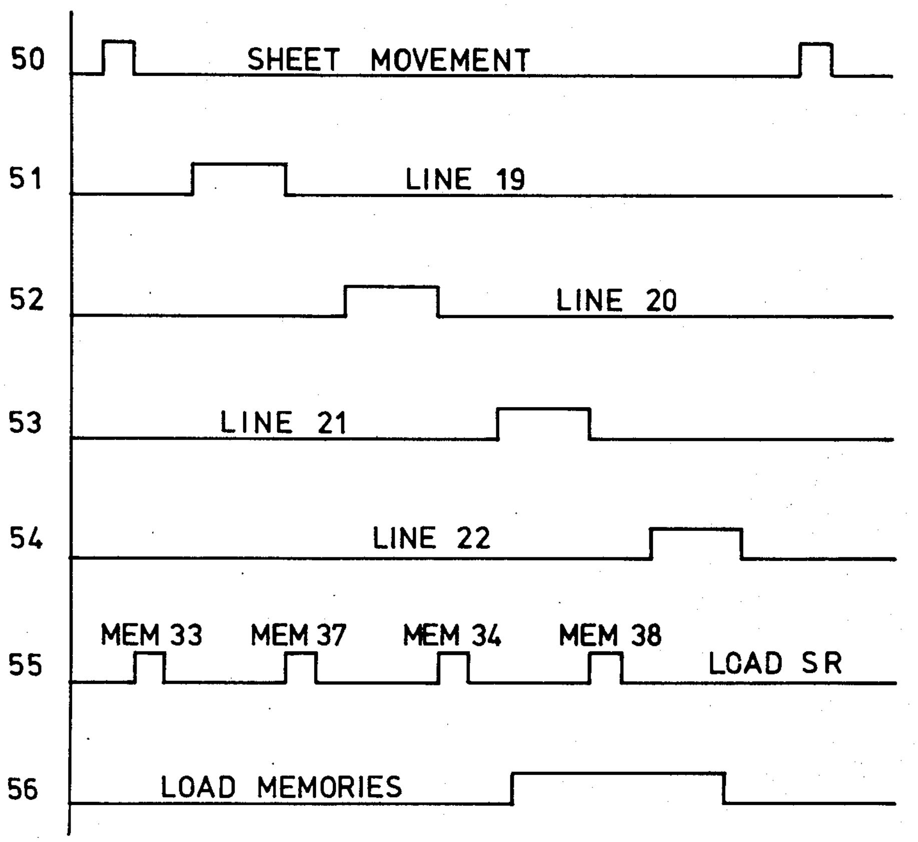
FIG. 3 is a timing diagram illustrating the timing of the system of FIG. 2.

FIG. 3 indicates the timing of these print drive operations. It is assumed that the four memories have been initially loaded. Line 50 indicates the timing of sheet movement between lines. With the dimensions of the print head indicated above, the distance moved between the pulses indicated on line 50 is 0.127 mm. Lines 51, 52, 53 and 54 indicate respectively the operation of voltage source lines 19, 20, 21 and 22. Line 55 indicates the timing of data transfer from the memories 33, 37, 34 and 38 to the driver/shift register 41. Lastly, line 56 indicates the timing of the loading of the memories from the input lines via logic circuit 32. It should be noted that this loading occurs before all the data from the memories has been applied to the driver/shift register. In order to avoid errors during this loading, in the second line operation, memories 35 and 39 are used instead of memories 34 and 38, and in the third line operation memories 36 and 40 are so used. Thus, the loading sequence is:

First line: memories 33, 37, 34, 38.
Second line: memories 33, 37, 35, 39.
Third line: memories 33, 37, 36, 40.

Thereafter, for the remaining lines, this sequence is repeated.

We will now turn to the case in which coded information is to be handled. This information is received by logic circuit 32 over line 43, and the logic circuit is switched to perform character font generation by means of a control signal from micro-processor 30 over line 45. Such character font generation arrangements are well known and will not be described in detail herein. Let us assume that each printed character is formed from a matrix of 20×20 dots. The code circuits, in response to each character line input, that is, the data corresponding to 20 print lines, generates the dot data in groups of four dots, group by group and line by line. Each dot group is applied over line 47 (FIG. 2) as four parallel bits. Of these, the first is applied to memories 33 and 37, the second to memories 34 and 38, the third to memories 35 and 39 and the last to memories 36 and 39. However, the memories are controlled such that at any one time, one bank, for example 33 through 36 is set for loading whilst the other, in this example 37 through 40, is set for reading. Thus, one memory bank is being loaded with the next line of dot data whilst the other is applying data for printing to the driver/shift register 41. Data from the output bank is fed to the driver/shift register in serial form from one memory at a time.

We will now refer again to the timing diagram of FIG. 3, and assume that the upper bank of memories has just been loaded and the lower bank is to be loaded. The timings for the return lines 19 through 20, together with the generation of drive pulses by the driver/shift register 41 as shown at lines 51 through 54 are the same as before. Now, however, the four active periods at line 55 indicate different operations. In the first (MEM 33), all of the 400 bits of data in memory 33 are read out serially whilst new bits are read into memories 37, 38, 39 and 40 in sequence, so that when all the data is read from memory 33, each memory in the lower bank has received 100 bits of data for the next line. In the second period (MEM 37), data from memory 34 is read into the driver/shift register, and each memory in the lower bank receives its next 100 bits. This operation is repeated at MEM 34 time at which memory 35 is unloaded, and MEM 38 time, at which memory 36 is unloaded. At the end of MEM 38 time, each of the memories in the lower bank now contains 400 bits of data ready for the next line to be printed. When the data from this bank is subsequently unloaded and applied to the driver/shift register 41, the memories in the upper bank are similarly loaded with 100 bits each for each memory unloaded from the upper memory bank.

Thus, what is provided is a system for energizing the print bars of a print head as shown in FIG. 1. As indicated above the system can handle both coded and non-coded information. It is, therefore, useful for graphic as well as character printing. It is clear that the arrangement need not be restricted to the number of memories shown, only that they must be able to handle the received information at a speed sufficiently great to transfer data to the driver arrangement in time for full dot formation in each line. Though, in the coded information mode, the memories were grouped in fours, it is clear that the system could operate with more, or less, memories in a group provided that their number corresponds with the number of parallel bits provided by the logic circuits. It is further pointed out that the system can be used for line printing in either scanning direction.

While the invention has been particularly shown and described with reference to a preferred embodiment thereof, it will be understood by those skilled in the art that various changes in form and detail may be made without departing from the spirit and scope of the invention.

We claim:

1. A drive system for driving the elements of a non-impact printer using a two row array of elements having voltage source lines coupled to individual rows interspersed with drive return lines coupled to both rows to define groups of four elements between each drive return line and its adjacent voltage source lines, said system comprising drive means having a plurality of stages corresponding in number to the source lines and each coupled to a corresponding one of the drive return lines, a plurality of memories each having a data capacity equal to that of the drive means, addressing means for controlling the entry of input data into the memories and loading of the drive means from the memories in turn such that the drive means, in accordance with data applied thereto drives, in succeeding periods, the drive return lines to effect energization in turn of the correspondingly positioned ones of the elements in each of said groups of four.

2. A drive system as claimed in claim 1 in which said addressing means is effective to allocate consecutive bits of an input bit stream to different ones of a group of four of said memories in turn, and is effective, subsequent to loading of a line of data in said group of memories, to unload each of these memories fully in turn to the drive means to effect energization of the drive lines between unloading of one memory and unloading of the next.

3. A drive system as claimed in claim 1 in which said addressing means is effective to allocate consecutive bits of an input bit stream to different ones of a group of four of said memories in turn and, during said allocation, to transfer data from a further group of four memories, previously so loaded, fully from each memory of the further group in turn, to the drive means to effect drive line energization.

4. A drive system as claimed in claim 3 in which said consecutive bits of an input bit stream are applied in parallel to pairs of corresponding registers of both of said groups, but are accepted into only the registers not transferring data to the drive means.

5. A drive system as claimed in claim 1 in which the drive means includes a shift register which is loaded from the memories serially and is read in parallel fashion to effect drive line energization.

6. A drive system as claimed in claim 2 in which the drive means includes a shift register which is loaded from the memories serially and is read in parallel fashion to effect drive line energization.

7. A drive system as claimed in claim 3 in which the drive means includes a shift register which is loaded from the memories serially and is read in parallel fashion to effect drive line energization.

8. A drive system as claimed in claim 4 in which the drive means includes a shift register which is loaded from the memories serially and is read in parallel fashion to effect drive line energization.

* * * * *